(12) United States Patent
Granestrand et al.

(10) Patent No.: US 8,306,370 B2
(45) Date of Patent: Nov. 6, 2012

(54) MACH ZEHNDER MODULATOR

(75) Inventors: Per Granestrand, Tyreso (SE); Jan-OLof Wesstrom, Barcelona (ES); Dave Adams, Stockholm (SE)

(73) Assignee: Syntune AB, Kista (SE)

( * ) Notice: Subject to any disclaimer, the term of this patent is extended or adjusted under 35 U.S.C. 154(b) by 155 days.

(21) Appl. No.: 12/666,400

(22) PCT Filed: Jun. 10, 2008

(86) PCT No.: PCT/SE2008/050692
§ 371 (c)(1), (2), (4) Date: Jun. 1, 2010

(87) PCT Pub. No.: WO2009/002255
PCT Pub. Date: Dec. 31, 2008

(65) Prior Publication Data
US 2011/0007995 A1 Jan. 13, 2011

(30) Foreign Application Priority Data
Jun. 27, 2007 (SE) ...................................... 0701557

(51) Int. Cl.
*G02F 1/35* (2006.01)
*G02B 6/00* (2006.01)
(52) U.S. Cl. ........................................... 385/3; 385/140
(58) Field of Classification Search .................. 385/1–3, 385/8–9, 140
See application file for complete search history.

(56) References Cited

U.S. PATENT DOCUMENTS

| | | | | |
|---|---|---|---|---|
| 5,323,406 A | * | 6/1994 | Yee et al. | 372/26 |
| 6,522,793 B1 | * | 2/2003 | Szilagyi et al. | 385/2 |
| 2003/0026518 A1 | * | 2/2003 | Pezeshki et al. | 385/14 |
| 2004/0141691 A1 | * | 7/2004 | Wiesmann et al. | 385/40 |

FOREIGN PATENT DOCUMENTS

| | | |
|---|---|---|
| EP | 0 989 423 | 3/2000 |
| GB | 2 374 945 | 10/2002 |

OTHER PUBLICATIONS

International Search Report dated Nov. 6, 2008, from corresponding PCT application.

* cited by examiner

*Primary Examiner* — Uyen Chau N Le
*Assistant Examiner* — Michael Mooney
(74) *Attorney, Agent, or Firm* — Young & Thompson

(57) ABSTRACT

A Mach Zehnder (MZ) modulator (1) includes a splitter (4) for splitting incident light in one wave guide (3) into two modulator arms (5,6) of the MZ and a combiner (7) that combines light from the two arms (5,6) into an output mode, where electrodes (9,10) are present in connection with the arms (5,6) for changing the refractive index in the arms in order to modulate incident light so that the light is amplified or so that an extinction, due to interference between the light in the two arms, takes place. The splitter (4) is arranged to split incident light equally into the two arms (5,6) and a part (11) of one of the arms (5) between the electrode (9) and the combiner (7) is designed to cause an intentional loss of light in the wave guide (5), whereby a desired asymmetry in transmission of the two arms (5,6) occurs.

5 Claims, 1 Drawing Sheet

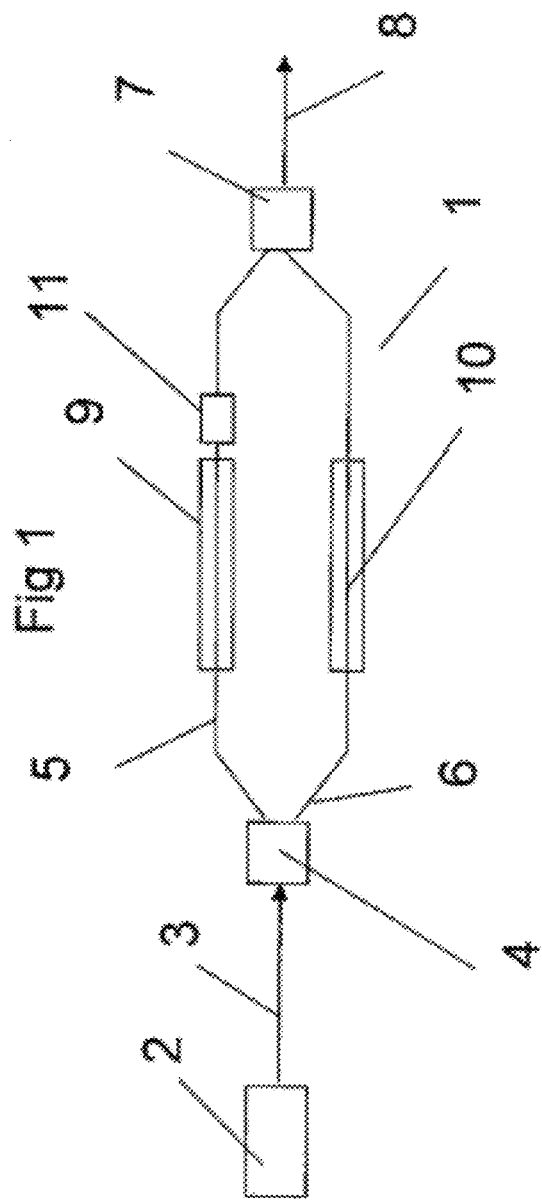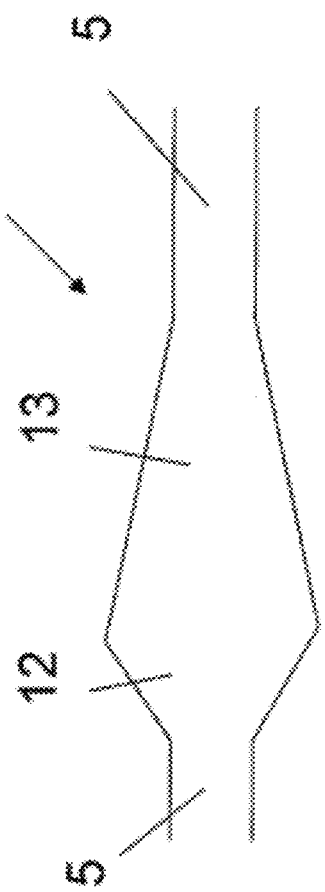

MACH ZEHNDER MODULATOR

A MZ modulator consists of a splitter that splits incident light in one wave guide into two modulator arms and a combiner that combines the light from the two arms into an out-put mode.

A Mach Zehnder (MZ) modulator is used to modulate incident light so that the light is amplified or so that an extinction, due to interference between the light in the two arms, takes place.

In a MZ modulator it is beneficial to have an unequal amount of light passing through the two arms to the output mode. This is to ensure a large ratio between the power levels between the on and off state, i.e. amplification or extinction, and at the same time obtain a desired frequency chirp properties. Frequency chirp is a change in the wavelength when a laser is modulated with a MZ at high bit rates.

One known solution is to have an unequal splitting ratio, so that more power is launched into one arm then the other arm. Additionally an unequal combiner ratio is beneficial for the maximum throughput.

One disadvantage with an unequal splitting ratio is that different intensities of light is present in the two arms. The consequences of that is that when for example the input light power to the modulator is changed, the arm with higher light intensity will experience a stronger heating due to higher light absorption and higher photo current than the other arm. The change of the difference in heating causes a change of the phase difference between the arms. Since the MZ modulator is based on interferometry the changed phase difference may cause the modulator to mal function or require the bias voltages to be adjusted to compensate for the changed phase difference.

The present invention solves this problem.

The present invention refers to a Mach Zehnder (MZ) modulator comprising a splitter for splitting incident light in one wave guide into two modulator arms of the MZ and comprising a combiner that combines light from the two arms into an output mode, where electrodes are present in connection with said arms for changing the refractive index in said arms in order to modulate incident light so that the light is amplified or so that an extinction, due to interference between the light in the two arms, takes place, and is characterised in, that the splitter is arranged to split incident light equally into the two arms and in that a part of one of the arms between said electrode and said combiner is designed to cause an intentional loss of light in the wave guide so that a desired asymmetry in transmission of the two arms occurs.

Below the present invention is described in more detail, partly in connection with exemplifying embodiments of the invention and a drawing, where FIG. 1 schematically shows a MZ where the present invention is implemented FIG. 2 schematically shows a for making an intentional loss of light in a waveguide.

FIG. 1 schematically shows a Mach Zehnder (MZ) modulator 1. Light from a laser 2 is fed to the MZ via a wave guide in form of an optical fibre 3. The MZ comprises a splitter 4 for splitting incident light in said wave guide 3 into two modulator arms 5, 6 of the MZ. The MZ also comprises a combiner 7 that combines light from the two arms into an output mode. The light is guided from the MZ in a wave guide in form of an optical fibre 8. Electrodes 9, 10 are present in connection with said arms 5, 6 for changing the refractive index in said arms in order to modulate incident light so that the light is amplified or so that an extinction, due to interference between the light in the two arms, takes place. The electrodes are activated according to a push-pull sequence, where one of the electrodes are provided with a positive voltage while the other electrode is provided with a negative voltage and vice versa.

The invention is characterised in, that the splitter 4 is arranged to split incident light equally into the two arms 5, 6 and in that in a part 11 of one 5 of the arms between said electrode 9 and said combiner 7 is designed to cause an intentional loss of light in the arm 5 so that a desired asymmetry in transmission of the two arms 5, 6 occurs.

The splitter may be a multimode modulator interferometer (MMI).

Hereby an equal splitting ratio is maintained and an asymmetry is created at the end of the MZ after the modulator electrodes. The asymmetry of light intensities will then cause a very small phase difference since a very short distance is subjected to the asymmetry and this short distance does not have modulator electrodes and is therefore never reverse biased. The absence of reverse bias leads to a low absorption of light. Then the change in difference in heating due to electric current in the electrodes, and in phase difference, between the two arms when changing the power level becomes small. Therefore, the device will work for a large range of input power.

The man skilled in the art has no problem of designing the said part such that the light in one arm is in phase, or approximately in phase, with the light in the other arm, or that the light in one arm is 180 degrees out of phase, or approximately out of phase, with the light in the other arm respectively, when combined in the combiner 7 and that the amplitude of the light in the two arms are equal. Hereby, the output light in the wave guide 8 is amplified or will be extinguished.

According to one preferred embodiment of the invention said part comprises a loss device attenuator.

According to another preferred embodiment, illustrated in FIG. 2, said part comprises a widening of the arm along a short length, at 12 in FIG. 2, of the arm followed by a decrease of width of the arm, at 13 in FIG. 2, along a length long enough to avoid reflections but short enough for the light propagation to be nonadiabatic.

As an example the attenuator 11 can cause that 40% of the light at the combiner comes from the arm 5 with the attenuator, while 60% of the light comes from the other arm 6.

According to still another preferred embodiment, the combiner that has an inherent uneven splitting ratio.

There are other ways to make an intentional loss such as using a branch and lead off some light or a directional coupler.

The invention is not limited to the above described embodiments of the invention, but can be modified within the scope of the patent claims.

The invention claimed is:

1. A Mach Zehnder (MZ) modulator comprising a splitter for splitting incident light in one wave guide into two modulator arms of the MZ and comprising a combiner that combines light from the two arms into an output mode, where electrodes are present in connection with said arms for changing the refractive index in said arms in order to modulate incident light so that the light is amplified or so that an extinction, due to interference between the light in the two arms, takes place, characterised in that the splitter is arranged to split incident light equally into the two arms and in that one of the modulator arms comprises means for attenuating the incident light positioned between said electrode and said combiner to create an asymmetry in transmission of the incident light between the two modulator arms such that light combined in the combiner forms an output light comprising an unequal amount of light from each of the modulator arms due to the means for attenuating the incident light.

2. A Mach Zehnder modulator according to claim 1, characterised in that said means for attenuating the incident light comprises a loss device attenuator.

3. A Mach Zehnder modulator according to claim 1, characterised in that said means for attenuating the incident light part comprises a widening of said one of the modulator arms along a short length of the arm followed by a decrease of width of the arm along a length sufficient to avoid reflections and sufficient for the light propagation to be nonadiabatic.

4. A Mach Zehnder modulator according to claim 1, characterised in that the combiner has an inherent uneven splitting ratio.

5. A Mach Zehnder modulator according to claim 2, characterised in that said means for attenuating the incident light comprises a widening of said one of the modulator arms along a short length of the arm followed by a decrease of width of the arm along a length sufficient to avoid reflections and sufficient for the light propagation to be nonadiabatic.

* * * * *